Figure 1:
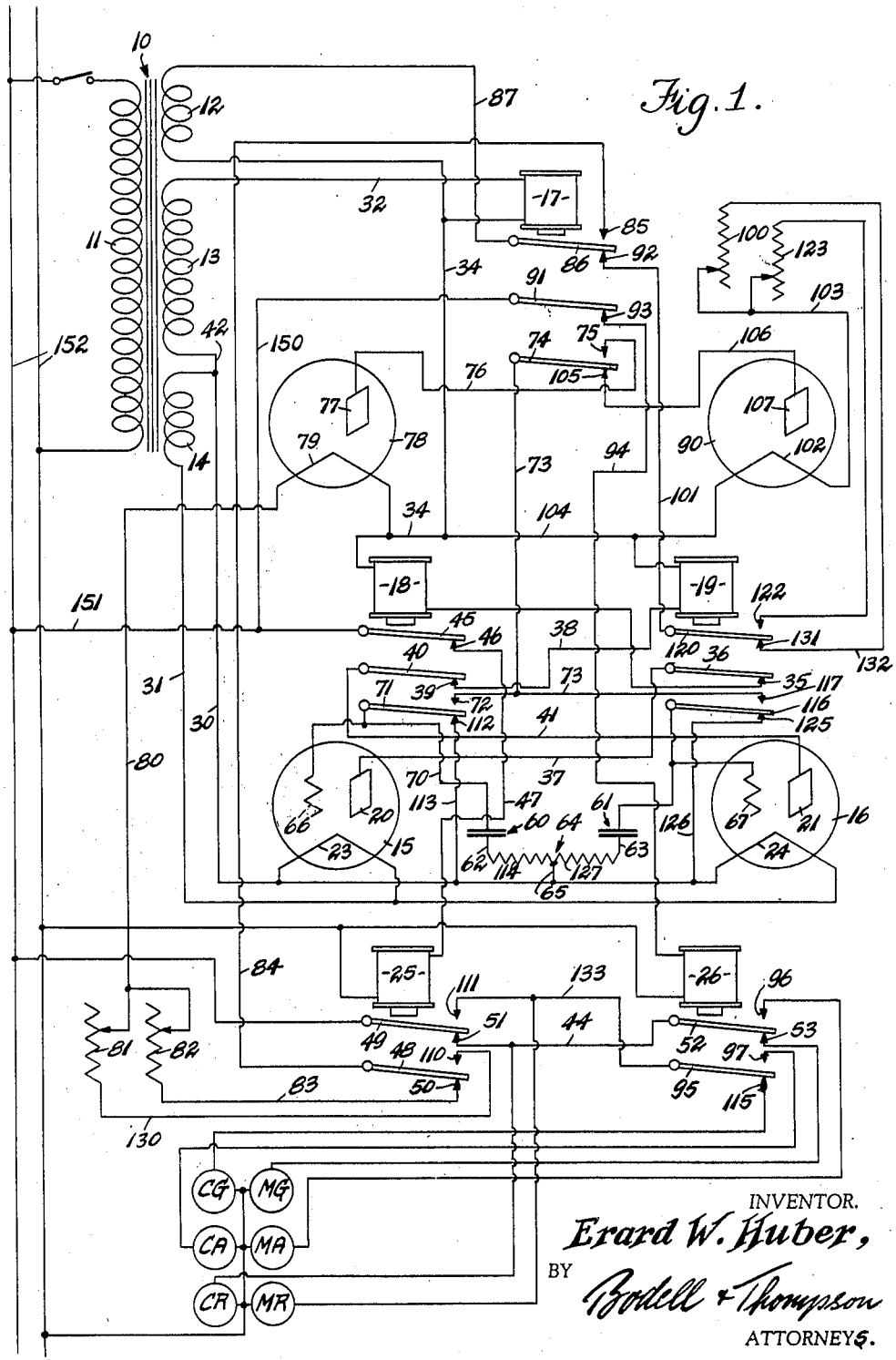

July 7, 1936.  E. W. HUBER  2,047,127
CYCLE TIMER
Filed Aug. 11, 1933   2 Sheets-Sheet 1

INVENTOR.
Erard W. Huber,
BY
Bodell & Thompson
ATTORNEYS.

July 7, 1936.  E. W. HUBER  2,047,127
CYCLE TIMER
Filed Aug. 11, 1933  2 Sheets-Sheet 2

INVENTOR:
Erard W. Huber,
BY Bodell & Thompson
ATTORNEYS.

Patented July 7, 1936

2,047,127

UNITED STATES PATENT OFFICE 2,047,127

CYCLE TIMER

Erard W. Huber, Syracuse, N. Y., assignor to Crouse-Hinds Company, Syracuse, N. Y., a corporation of New York Application August 11, 1933, Serial No. 684,746

7 Claims. (Cl. 175—320)

This invention relates to a cycle timer of the type operable through a predetermined cycle having a plurality of periods, the timer being used to control a plurality of electrical circuits.

An object of the invention is a cycle timer operating upon, or consuming, a minimum amount of energy, and operating with a minimum amount of maintenance or repair, and which can be constructed at a minimum manufacturing cost.

A further object of the invention is the provision of means for varying the duration of each period of the cycle without affecting the duration of any other period of the cycle. Also, the total period of the cycle may be varied without affecting the relative duration of the periods of the cycle.

The invention consists in the novel features and in the combinations and constructions hereinafter set forth and claimed.

In describing this invention, reference is had to the accompanying drawings in which like characters designate corresponding parts in the drawings, the timer being shown as associated with a highway traffic signal.

In Figure 1 the timer is represented diagrammatically.

Figure 2:
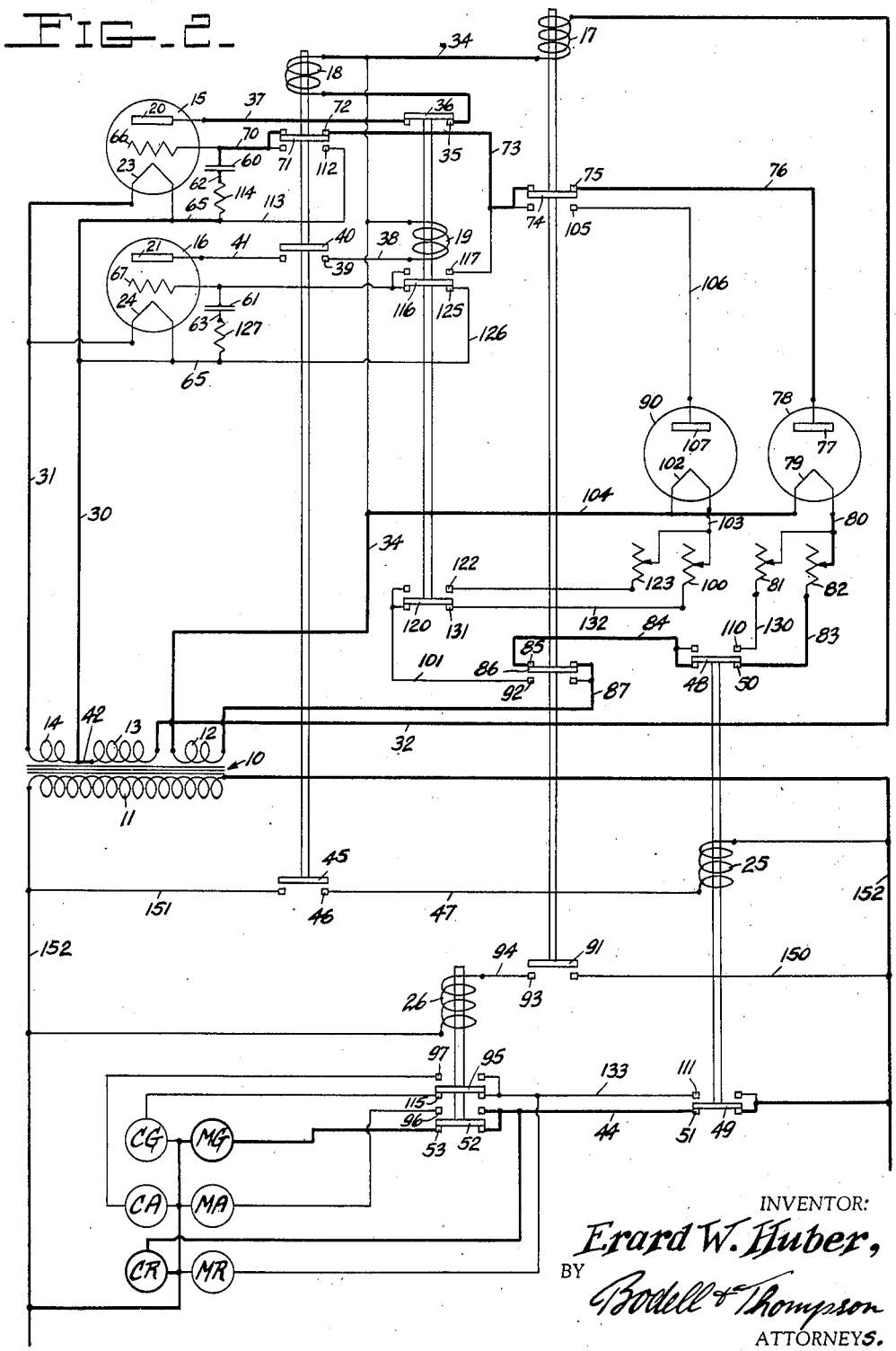

Fig. 2 is an across the line schematic diagram of the apparatus shown in Figure 1 with the green or go signal displayed to the highway, the conductors carrying current at this period being represented by the heavy lines.

The invention comprises generally, switching mechanism for controlling the plurality of electrical circuits to be controlled, an energizing circuit for operating the switching mechanism, a pair of thermionic valves, and means controlled by the switching mechanism for successively connecting and disconnecting said valves in the energizing circuit, a condenser connected across the filament and the control grid of each of said valves, a charging circuit, and a discharging circuit for said condensers, means controlled by said switching mechanism to connect one of said thermionic valves in the energizing circuit during certain periods of the cycle, and to disconnect said valve and connect the second valve in said circuit during the remaining periods of the cycle, and means also controlled by said switching mechanism to connect the condensers to the charging circuit while the valves are connected to the energizing circuit, a plurality of control circuits, and means controlled by said switching mechanism to successively connect said control circuits to the charging circuit during successive periods of the cycle when the respective valves are connected to the energizing circuit, whereby the flow of current through the energizing circuit of the switching mechanism is controlled by the thermionic valves, or by the charge of their associated condensers which in turn are controlled by the control circuits energizing the charging circuit of the condensers.

The invention also includes means in the respective control circuits for varying the flow of current through said circuit whereby the duration of the respective periods of the cycle may be varied.

Referring to the drawings, 10 designates a power transformer having a primary winding 11, and secondary windings 12, 13 and 14. The secondary windings 12 and 14 are of comparatively low voltage with an output of 2½, or less volts. The secondary winding 13 is of comparatively high voltage, the output being approximately 270 volts. The secondary winding 14 furnishes filament current to the vacuum tubes, or thermionic valves, 15, 16. One side of the winding 13 is connected through the relays 17, 18, 19, to the plates 20, 21, of the tubes 15, 16, respectively, and the other side of the winding 13 is connected to one side of the filament circuit of the tubes 15, 16. Accordingly, the flow of current through the tubes 15, 16, controls generally speaking, the operation of the relays 17, 18, and 19. As here shown, the relay 18, through suitable connections, controls the load relay 25, and the relay 17 in like manner the load relay 26.

The filaments 23, 24, of the valves 15, 16 respectively, are connected directly to the winding 14 through the conductors 30, 31. One side of the winding 13 is connected to the relay 17 through the conductor 32, and the other side of the relay 17 is connected to the conductor 34 which, in turn, is connected to one side of the relays 18 and 19. The other side of the relay 18 is connected through the stationary contact 35, movable contact 36, conductor 37, to the plate 20 of the tube 15. The other side of the relay 19 is connected by the conductor 38 to the stationary contact 39, movable contact 40, conductor 41, to the plate 21 of tube 16. The other side of the winding 13 is connected to the conductor 36 by the wire 42. As thus described, there is a circuit of comparatively high voltage through the relays 17, 18, 19, to the plates 20, 21 of the valves 15, 16. These relays and the valves are so designed that when the filaments 23, 24, of the tubes become heated, and the grids 66, 67 are at zero potential relative to the filaments 23, 24, sufficient current will pass through the tube to operate the relays 17, 18, 19. However, one of the relays 18, or 19, is so adjusted, or designed, that it will pick up or operate before the other. The contacts 35, 36, 39, 40, are associated with the relays 19, 18, respectively, and the contacts 36, 40 are attached to the armature of the relay and moved thereby when the relay is properly energized.

Assuming that relay 18 is adjusted so that it will close previous to the closing of the relay 19, it will be noted that the relay 19 can not then operate, or close, due to the fact that the contacts 39, 40 associated with relay 18 have become separated thus breaking the circuit to the relay 19. Upon the closing of the relay 18, the contact 45 is moved out of engagement with the contact 46. The contact 45 is supplied with a hot source of current, and the contact 46 is connected to the relay 25 through the conductor 47. The relay 25 is therefore, deenergized and its movable contacts 48, 49 are in engagement with the stationary contacts 50, 51. The contact 49 is hot at all times, and when now in engagement with contact 51, current is supplied to the movable contact 52 associated with load relay 26, and as this relay is also now deenergized, due to the operation of relay 17, contact 52 is in engagement with contact 53.

In employing the device as a timer for traffic signals, the contact 51 is connected to the red, or stop, signal CR on the cross street, and contact 53 is connected to the green, or go, signal MG on the main street.

Means is employed for regulating, or modulating the flow of current through the valves 15, 16, which means is, in turn, controlled by a super-sensitive means whereby a very fine or close control of the current flowing through the valves 15, 16 is provided. Primarily, the means for controlling the flow of current through the tubes 15, 16, comprises condensers 60, 61, one side of these condensers being connected to the conductor 30, through the conductors 62, 63, resistances 114, 127, and conductor 65. The other side of the condensers 60, 61, are connected to the grids 66, 67, of the tubes 15, 16 respectively.

It will be understood by those skilled in the art that the potential supplied to the grids of the tubes 15, 16, controls the current flowing between the plates 20, 21, and the filaments 23, 24. As the potential increases at the grids 66, 67, negative to the filaments 23, 24 the flow of current through the valves 15, 16, diminishes, and when this current diminishes to a predetermined value, the relays 18, 19, associated with the tubes 15, 16, will drop out, or open, as will also the relay 17. The side of the condenser 60, which is connected to the grid 66, is connected by a conductor 70 to the movable contact 71 associated with relay 18 and operated thereby. As shown in the drawings, the movable contacts 49, 45, and 71, are all associated with the armature of relay 18, and when the relay is deenergized, the movable contacts are in their down position, as indicated in Figure 1. Therefore, as relay 18 is now energized, contact 71 will be in engagement with contact 72 which is connected by conductor 73 to movable contact 74 associated with relay 17 and which, because the same is energized, is now in engagement with contact 75 which, in turn through conductor 76, is connected to the plate 77 of the tube 78. One side of the filament 79 of tube 78 is connected to the conductor 34, and the other side through conductor 80 to the variable resistances 81, 82.

Inasmuch as the relay 25 is deenergized, the contacts 48, 50, are engaged, and a circuit is completed through the resistance 82, conductor 83, contact 50, movable contact 48, conductor 84, stationary contact 85, movable contact 86, conductor 87, winding 12, conductor 34, to the other side of the filament 79 of tube 78. That is, the filament 79 of the tube 78 is heated through connection with the secondary winding 12 of the transformer 10.

It appears from the circuit just described, that the condenser 60 is connected in circuit through the tube 78, and the rate of charge of the condenser 60 is controlled by the amount of current flowing through the tube 78. The tube 78 is of the two electrode type, the electrodes consisting of the plate 77 and the filament 79. The charging current for the condensers 60, 61, is obtained from the high voltage winding 13 of the transformer 10. The charging circuit for the condenser 60 includes the wires 30, 65, resistance 114, wire 62, condenser 60, wire 70, armature 71, contact 72, wire 73, armature 74, contact 105, wire 106, plate 107, filament 102, wires 104, 34, relay 17, wire 32. The charging circuit for the condenser 61 is similar, except it passes through armature 116, contact 117. Also, the charging circuit is shifted from tube 90 to 78 by operation of the armature 74.

It is also well known to those skilled in the art that the current flow through a vacuum tube, or thermionic valve, may be modulated by controlling the temperature of the filament as well as varying the potential of the grid with respect to the filament. The latter method is used in connection with the modulation of tubes 15, 16, and change in filament temperature is employed in tubes 78, 90.

In the filament circuit of tube 78, as previously described above, the current from the secondary winding 12 passes through the variable resistance 82 and accordingly, by adjusting the resistance 82 the temperature of the filament 79 may be varied and therefore, varying the flow of current through the tube 78 and therefore, varying the rate of charge of the condenser 60. As the resistance 82 is cut down, the charging rate of the condenser is raised, and the same will become charged in less time than if more of the resistance 82 was cut in circuit.

It will be noted that the charge built up on the side of the condenser to which the grid is connected is a negative one relative to the filament of thermionic tube 15. The reason for this is because this side of the condenser is connected to the plates of the valves 78 or 90 so that the current must flow through the tube from the plates to the cathode or filaments 79, 102. The current flowing from positive to negative therefore establishes the side of the condenser connected to the resistance 64 as positive, and any change in the charge of the condenser must necessarily be that the charge on the condenser plates connected to the grids assumes a charge negative relative to the condenser plates connected to the resistance 64, these plates being at all times at the same, or nearly the same, potential as the filaments 23 and 24 of tubes 15 and 16, as these plates are metallically connected to the filaments 23, 24.

As the condenser 60 becomes charged and thereby raises the potential negatively on the grid 66, the current flow through the tube 15 is reduced. Eventually, this current flow is reduced to the point where the relays 17, 18 now in circuit with the tube 15 will drop out. However, the relay 17 is so designed, or adjusted, that it will drop out at a higher current value than the relay 18.

For example, the relay 17 may drop out when the current flow through the tube 15 drops to .005 ampere, and the relay 18 at .002 ampere. Accordingly, the relay 17 always drops out before the relay 18 or 19.

When the relay 17 drops out, the movable contacts 86, 91, move downwardly into engagement with contacts 92, 93. This shifting of the contacts of relay 17 energizes the work relay 26 in the following manner: The contact 91 is at all times hot, being connected through conductors 150, 151, to one side of the feed circuit 152, and is connected to one side of the relay 26 through the conductor 94, the other side of the relay being connected to the other side of the line. The movable contacts 52, 95, of the load relay 26, now energize, move into engagement with contacts 96, 97. However, only the contact 52 is hot inasmuch as the movable contact 49 of relay 25, which is always hot, is in engagement with contact 51 which is connected to movable contact 52 through conductor 44. This, in practical effect, causes a shift from the load circuit, connected with the contact 53, to the load circuit connected with the contact 96.

As previously described, when the device is employed as a traffic signaling timer, the contact 53 is connected to the green, or go, signal MG on the main street. The contact 96 is connected to the amber, or caution, signal MA on the main street. It will be remembered that the stop, or red, signal CR on the cross street is connected with contact 51. Therefore, up to the moment we still have a display of the cross street red, and display of the main street amber, in place of the main street go, or green. This particular sequence of colors is known, to those skilled in the art, as amber following the green only. However, it is obvious that any sequence of colors, such as amber following the red, or amber overlapping, can be obtained by bringing conductors from the various contacts of the work relays 25, 26, to a terminal block and then interchanging the connections to secure the desired sequence.

When the relay 17 dropped out, the tube 90 became substituted for the tube 78, the substitution also including a new variable resistance 100. This substitution being effected as follows: The movable contact 86 is moved out of engagement with contact 85 which broke the circuit to the filament 79 of tube 78, and is moved into engagement with contact 92 which is connected to the variable resistance 100 through the conductor 101, movable contact 120, contact 131, and conductor 132. The other side of the resistance 100 is connected to one leg of the filament 102 of tube 90 through the conductor 103, the other leg of the filament 102 being connected to the conductor 34 through conductor 104. Also, the contact 74 has moved out of engagement with contact 75 which was connected to the plate 77 of tube 78 through conductor 76, and has moved into engagement with contact 105 which is connected through conductor 106 to the plate 107 of tube 90. It is to be remembered that movable contact 74 is connected to one side of the condenser 60 through conductor 70, contacts 71, 72, conductor 73. The contacts 71, 72 are still in engagement due to the fact that the relay 18 has not as yet dropped out.

We have now the charging rate of the condenser 60 controlled by the tube 90 and the variable resistance 100. It will be observed that while the load circuit associated with contact 53 was under the control of the variable resistance 82, the new load circuit associated with contact 96 is under the control of a separate variable resistance 100. The circuits thus far described, constitute an important feature of my invention. It will be noted that there are no moving parts in my timer, except the armatures of the relays, and due to the fact that the relays 17, 18, 19, only break sufficient current to operate the work or load relays 25, 26, they will operate indefinitely without any material destruction to their contacts. However, the conductors 47, 94, may be employed as work circuits, depending on what purpose the timer is used for.

Also, in view of the fact that the tubes 15, 16, 78, and 90, are only used to modulate the current flowing through the relays 17, 18, 19, the filament current employed is much less than the normal operating current for the tube. This lower potential increases the life of the tube many fold. Obviously, high resistances may be employed in place of the tubes 78, 90, to control the charging rate of the condensers 60, 61. However, serious disadvantages are encountered by the use of such resistances due to the fact that their function is affected by changes in atmospheric conditions, such as temperature and humidity. These changes are of such a nature that accurate timing can not be obtained. Also such resistance would be subject to the usual difficulties incurred in the use of high resistances, such as short circuits, burn outs etc. It will also be noted that the tubes 78, 90, are only connected in circuit when they are actually employed to control the timing of the device. The apparatus could be so connected that one tube would serve the purpose of these two tubes. However, additional relays would be required, and the life of the tube would be materially reduced, and if the single tube should burn out, or became damaged, the apparatus would fail entirely to function.

The description has proceeded thus far to the point where the rate of charge of the condenser 60 is under the control of the tube 90. Eventually as this condenser becomes charged, and the negative potential raised sufficiently on the grid 66, the flow of current through the tube 15 will gradually diminish, and the relay 18 will drop out. This will establish the circuit through the load relay 25 and permit the movable contacts 48, 49, to move out of engagement with contacts 50, 51, and into engagement with contacts 110, 111. Inasmuch as the contact 49 is always hot, this opens the work circuit connected to the contact 51, and closes the work circuit connected with the contact 111 which, in traffic signal use, will be the main street red, or stop, indication MR. Simultaneously, with the dropping out of relay 18, the contacts 39, 40, will again become engaged, and a new circuit will be completed through the relays 17, 19, to the plate 21 of tube 16, and the relay 17 will again instantaneously close as will also the relay 19.

When the relay 18 drops out, its movable contact 71 will become engaged with stationary contact 112 which is connected to the conductor 30, through the conductor 113. This forms a short circuit through the condenser 60 and portion 114 of the high resistance 64. This will cause a discharge of the condenser 60 so that when it is again connected in the charging circuit, it will start from a zero value, whereby the timing will always remain constant. The discharge of the condenser 60 is not instantaneous, due to the portion 114 of the high resistance. The object of this is to prevent a reflow, or surge, of current through the tube 15 which might again close the relay 18 before the relay 19 closes, or cause the relay 18 to chatter. This feature is important when the timer is used for traffic signal work.

The closing of the relays 17 and 19 is instantaneous, due to the fact that there is no potential on the grid 67 of the tube 16, there is an appreciable flow, or surge, of current through the tube and, accordingly, through the relays. Also, upon closing of the relay 17, the hot movable contact 91 is shifted out of engagement with the contact 93 which is connected in circuit to the load relay 26 through the conductor 94 and therefore, the relay 26 is again opened, shifting the movable contact 95, which is connected through conductor 133 to contact 111, into engagement with contact 115 which is connected to a new load circuit, or in the present instance, to the cross street go signal CG.

In the description thus far, the timer has passed through two periods of its cycle, and is now on the third. Initially, the cross street red, and the main street green, were displayed. Following that, the main street green was extinguished, and the main street amber displayed. At present, the cross street red is extinguished, and the main street red displayed together with the cross street green.

The operation of the third and fourth periods of the cycle is substantially the same as the previous periods. When the relay 19 closed, movable contact 116 moved into engagement with contact 117 which connected one side of the condenser 61 with the conductor 73 which in turn, through the now closed contacts 74, 75, is connected to the plate 77 of the tube 78. One leg of the filament 79 of this tube is connected to conductor 34, and the other leg connected through the variable resistance 81, through conductor 130, contacts 110, 48, conductor 84, contacts 85, 86, conductor 87, to the other side of the secondary winding 12. This circuit is the same as that previously described, except that because of the fact the relay 18 is now open, the relay 25 is energized, and the shifting of the contact 48 into engagement with the contact 110 cuts in the variable resistance 81 in place of the variable resistance 82.

The condenser 61 is now being charged at the rate determined by the flow of current through the tube 78 which in turn is controlled by the variable resistance 81. As the potential on the grid 67 rises, and the flow of current through the tube 16 decreases, the relay 17 again drops out. This operation again removes the tube 78 from the charging circuit of the condenser 61, and substitutes the tube 90 in said circuit. This is accomplished by the shifting of the movable contact 86 from engagement with the contact 85, and into engagement with the contact 92 which, through the conductor 101, movable contact 120, stationary contact 122, resistance 123, conductor 103, completes the circuit through the filament 102 of tube 90, and the plate 107 of tube 90 is now connected in circuit through conductor 106, contacts 105, 74, conductor 73, to the condenser 61, so that the charging rate of the condenser 61 is now under the control of tube 90. Also, by the dropping out of relay 17, the hot movable contact 91 moves into engagement with contact 93 which, through conductor 94, is connected to energize the relay 26 which thereupon shifts the movable contact 95 into engagement with the contact 97 which is connected to a new load circuit, or the cross street amber CA. The condenser 61 continues to charge, and as the potential on the grid 67 increases, the current flow through the tube 16 decreases, and the relay 19 will drop out. The time of this operation is controlled by the setting of the variable resistance 123. Simultaneously, the movable contact 116 will be moved into engagement with stationary contact 125 which, through conductor 126, forms a short circuit for the condenser through the portion 127 of the high resistance 64 and the condenser is discharged in the same manner as was the condenser 60.

When the relay 19 dropped out, the movable contact 36 engaged the contact 35 which again completed the circuit through the relays 17, 18, tube 15, and both of the relays 17, 18, closed, thus opening the load relays 26 and 25 reestablishing the circuit to the cross street red through contact 51, and the main street green through contact 53. The apparatus now starts on a new cycle, as previously described.

What I claim is:

1. A work cycle timer including three relays, the coils of the second and third relays being connected each in series with the coil of the first relay, a pair of thermionic valves, one associated with each of the second and third relays, a source of electrical potential for heating the filaments of the valves, the valve associated with the second relay having its plate connected in series therewith through the contacts of the third relay, when deenergized, and the plate of the second valve being connected in series with the third relay through the contacts of the second relay, when deenergized, a condenser connected across the filament and the control grid of each of said valves, a charging circuit and a discharging circuit for each of said condensers, said charging and discharging circuits for each condenser being controlled by the relay associated with the tube to which the condenser is connected, a plurality of branch circuits for each of said charging circuits, each of said branch circuits including means for regulating the flow of current through the charging circuits, each charging circuit being shiftable from one branch circuit to another by the operation of the first relay, the first, second and third relays being arranged to operate on different amplitudes of current, whereby the first relay will close previous to the closing of either the second or third relays, and one of said latter relays will close previous to the closing of the other, and a pair of work circuits, one of which is controlled by the operation of the second relay, and the other by the operation of the first relay.

2. A work cycle timer operable through a cycle having a plurality of periods, said timer including switching means, an electro-responsive actuator for operating the switching means, a pair of operating circuits connected, through said switching means, to said actuator, each of said operating circuits including a thermionic valve, and a condenser connected across the control grid and the filament of each valve, a pair of charging circuits connected, through said switching means, to said condensers, each of said control circuits including means for controlling the charging current of said condensers, said switching means operating during its actuation through the cycle, to successively connect and disconnect the operating circuits to the actuator and the control circuits to the condensers.

3. A work cycle timer operable through a cycle having a plurality of periods, said timer including switching means, an electro-responsive actuator for operating the switching means, an operating circuit connected, through said switching means, to said actuator and including a thermionic valve, a condenser connected across the control grid and the filament of said valve, a pair of charging circuits connected, through said switching means, to said condenser, each of said charging circuits including means for controlling the charging current of said condenser, a discharge circuit connected to said condenser through said switching means, said switching means operating, during its actuation through the cycle, to successively connect and disconnect the charging circuits to said condenser and subsequently, to connect and disconnect the discharge circuit to said condenser.

4. A work cycle timer operable through a cycle having a plurality of periods, said timer including switching means, an electro-responsive actuator for operating the switching means, a pair of operating circuits connected, through said switching means, to said actuator, each of said operating circuits including a thermionic valve, a condenser connected across the control grid and the filament of each valve, a pair of charging circuits connected through said switching means to said condensers, each of said charging circuits including a thermionic valve, said switching means operating, during its actuation through the cycle, to successively connect and disconnect the operating circuits to the actuator and the charging circuits to the condensers, and means, in the charging circuits, for regulating the flow of current through the thermionic valves.

5. A cycle timer operable through a predetermined cycle having a plurality of periods to control a plurality of electrical circuits, including relay switches operable to open and close said electrical circuits, and means for operating said relay switches through the cycle including energizing circuits for said switches, a thermionic valve connected in each of said energizing circuits in series and arranged to control the flow of current therein, a condenser connected across the filament and control grid of each of said valves, a charging circuit for each condenser, the charging circuit for one of said condensers being connected through the movable contacts of one relay switch, and the charging circuit for the other condenser being connected through the movable contacts of another relay switch, and means controlled by said relay switches to vary the amplitude of the current in said charging circuits during different periods of the cycle.

6. A work cycle timer including switching means, and means for operating the switching means through a cycle having a plurality of periods to control a plurality of work circuits, said means including an electro-responsive actuator for operating the switching means, a pair of operating circuits for said actuator, each including a thermionic valve, a condenser connected across the control grid and the filament of each thermionic valve, a pair of charging circuits, each including means for controlling the charging current of said condensers, said switching means, during its actuation through the cycle, operating to connect said actuator in one of said operating circuits, and to connect one of said charging circuits to the condenser of the thermionic valve of said operating circuit during the first period of the cycle, and to connect the other of said charging circuits to said condenser during the second period of the cycle, and said switching means being further operable to connect said actuator in the other operating circuit and one of the charging circuits to the condenser of the thermionic valve of said other operating circuit during the third period, and in the fourth period to connect the other charging circuit to said condenser.

7. A work cycle timer operable through a cycle having a plurality of periods, said timer including switching means, an electro-responsive actuator for operating the switching means, a pair of operating circuits connected, through said switching means, to said actuator, each of said operating circuits including a thermionic valve and a condenser connected across the control grid and the filament of each valve, a charging circuit connected, through said switching means to said condenser, a plurality of control circuits each including means for controlling the flow of current in said charging circuit, said control circuits being connected through said switching means to said charging circuit, said switching means operating during its actuation through the cycle, to successively connect and disconnect the operating circuits to the actuator and the control circuits to said charging circuit.

ERARD W. HUBER.